United States Patent [19]
Simpson

[11] Patent Number: 4,562,793
[45] Date of Patent: Jan. 7, 1986

[54] HONDA RETAINER

[75] Inventor: Roy G. Simpson, Cookeville, Tenn.

[73] Assignee: Adams Plastics, Inc., Cookeville, Tenn.

[21] Appl. No.: 515,344

[22] Filed: Jul. 19, 1983

[51] Int. Cl.⁴ .............................................. A01K 15/00
[52] U.S. Cl. ..................................................... 119/153
[58] Field of Search ............. 119/153, 109; 24/115 H, 24/115 R, 127

[56] References Cited

U.S. PATENT DOCUMENTS

| 504,055 | 8/1893 | Shaw | 119/153 |
|---|---|---|---|
| 901,155 | 10/1908 | Dahms | 24/115 H |
| 2,339,671 | 1/1944 | Bergman | 24/115 R |
| 4,270,491 | 6/1981 | Cox | 119/109 |

Primary Examiner—Hugh R. Chamblee
Attorney, Agent, or Firm—Luedeka & Neely

[57] ABSTRACT

The specification discloses a honda retainer for a lariat to stop the lariat from sliding through the honda thus preventing the lasso from being fully tightened around the catch when the roper catches, but does not wish to retain the catch. The honda retainer includes a squat cylindrical member having a generally coaxial bore to admit the lariat therethrough. The honda retainer is secured in position on the portion of the lariat which forms the lasso by the use of four nails which insert into four radial bores in the cylindrical member to extend partially into the lariat in the axial bore.

6 Claims, 3 Drawing Figures

HONDA RETAINER

The present invention relates to lariats and particularly relates to a honda retainer for preventing a lasso from fully tightening around the animal or object to be roped during training and practice.

Lariats used for roping livestock or for roping demonstrations at rodeos are generally twenty-five to forty-five feet long and are usually three-eights or seven-sixteenths inches in diameter. They may be made from manila hemp, polyester, or nylon rope. To form a lasso on the end of a lariat, a metal, knotted, or spliced eye, referred to as a honda, is formed on the end of a lariat and the other end of the lariat is passed through the honda.

A problem often encountered during practice and training in roping animals with a lariat is that the lariat will slip tightly around the catch, and thus, the roper must dismount and untie the animal from the lariat. The roper must then remount, and recoil the lariat. When the roper does not wish to retain his catch, a knot is sometimes tied in the lariat in the section of the rope which forms the lasso. The knot is positioned close to the honda so that it will not interfere with the operation of the lasso, yet will prevent the lasso from closing down tightly on the catch. Therefore, the roper does not have to dismount and the catch is free to go without having to be untied.

A deleterious side effect of tying a knot in the lariat is that a permanent kink or twist is left in the lariat when the knot is untied. Such a kink or twist can hamper usefulness of the lariat for roping. Thus, a need has arisen for a honda retainer which does not introduce a kink or twist in, or otherwise adversely affect, the lariat. In addition, the honda retainer should be easily attached to the lariat and should be removable.

In accordance with the present invention, there is provided a honda retainer for a lariat having a honda to prevent the lasso from completely closing down on the catch during training and practice including a squat member having a central bore. The squat member is larger than the aperture of the honda, and the central bore in the squat member is dimensioned to admit the lariat therethrough. In addition, the honda retainer has a mechanism for securing the squat member to the lariat when the lariat is threaded through the central bore.

In accordance with a more particular aspect of the present invention, the honda retainer is provided with the central bore having a diameter equal to or slightly larger than the diameter of the lariat so that the lariat fits snugly in said central bore, and the mechanism for securing said squat member to the lariat is nails fitted in lateral bores in the squat member. The nails have sufficient length to extend from the outside surface of the squat member into the central bore and into the lariat. Preferably, the squat member is made of plastic, wood or compound materials.

The present invention may best be understood by reference to the following detailed description when considered in conjunction with the accompanying drawings in which.

Figure 1:
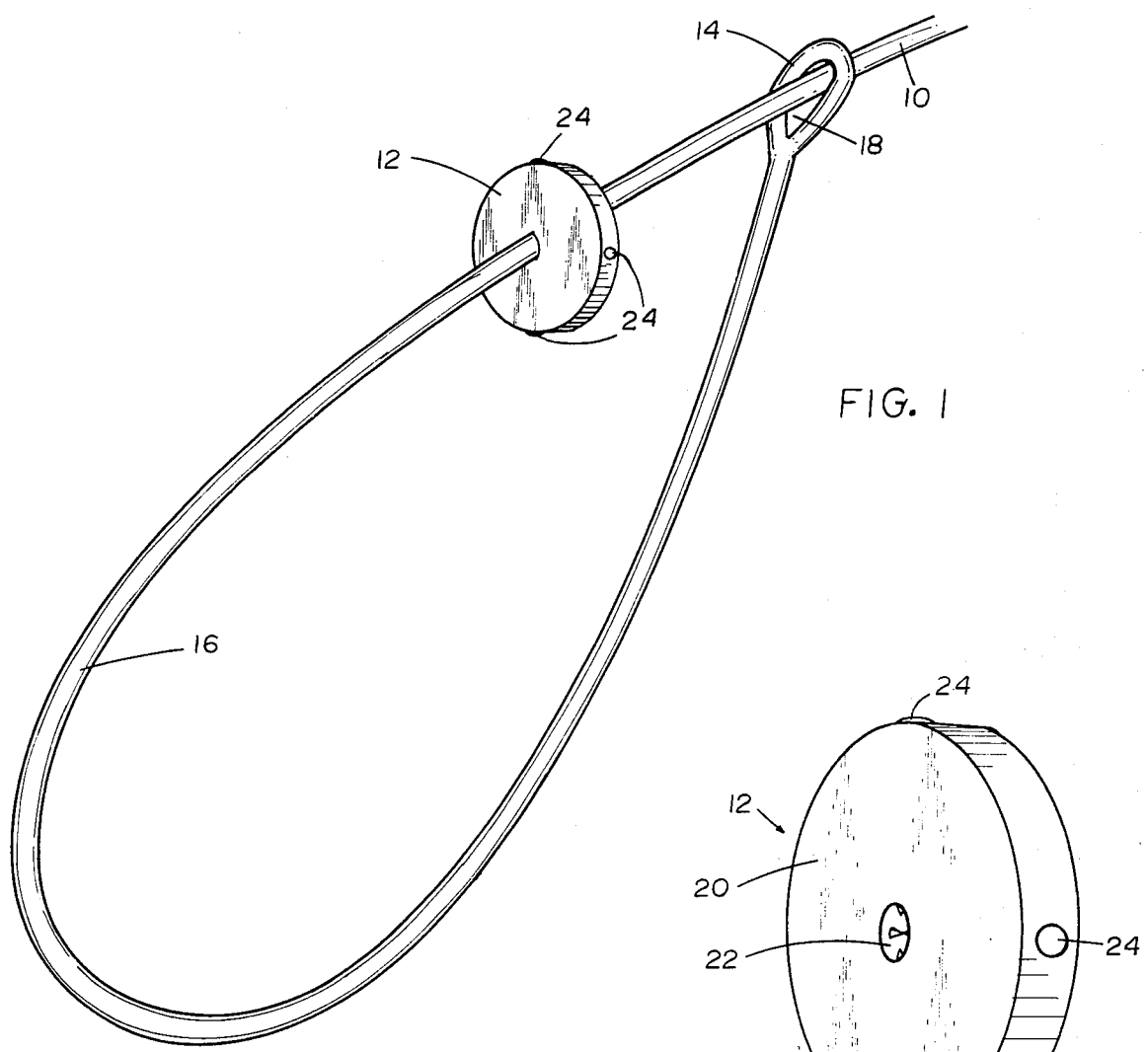
FIG. 1 is a perspective view of a portion of a lariat on which is fitted a honda retainer embodying one form of the present invention.

Referring now to the drawings in which like reference characters designate like or corresponding parts throughout the several views, there is shown in FIG. 1, a lariat 10 on which is fitted the honda retainer 12 embodying one form of the present invention. The lariat 10 is threaded through a honda 14 to form a lasso 16. The honda retainer 12 has a diameter greater than the diameter of the aperture 18 of the honda 14 and is secured to the portion of the lariat 12 which forms the lasso 16.

Figure 2:
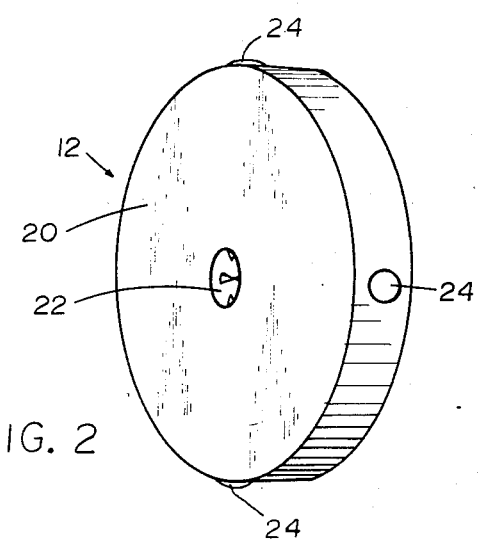
FIG. 2 is a perspective view of the honda retainer embodying one form of the present invention.

FIG. 2 shows the honda retainer 12 embodying one form of the present invention. The device is made from a squat cylindrical member 20 made of wood or plastic having a one and seven-eights inch diameter. An axial bore 22 having a seven-sixteenths inch diameter is formed in the cylindrical member 12 for admitting the lariat 10 therethrough. The axial bore 22 is thus sized so that it can accommodate a seven-sixteenths inch lariat with a snug fit. An alternate embodiment to accommodate a three-eights inch lariat would require a three-eights inch bore. Four one inch nails 24 (the heads of three are shown in FIG. 2) extend into the cylindrical member 20 and extend a short distance into the axial bore 22. The nails 24 extending into the axial bore 22 provide a mechanism for securing the cylindrical member 20 to the lariat 10 by extending a short distance into the lariat 10.

Figure 3:
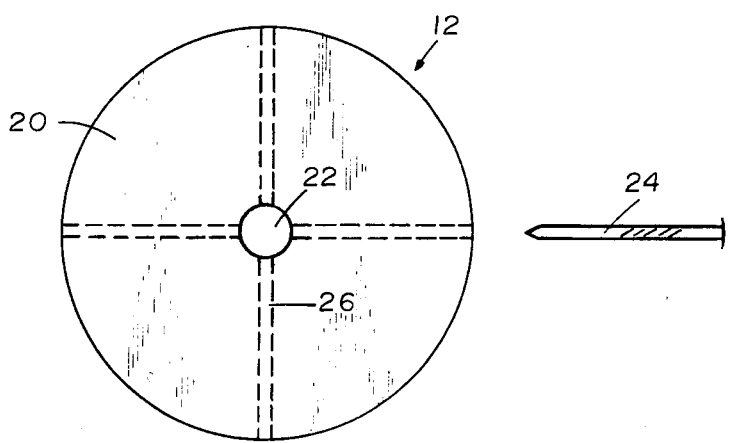
FIG. 3 is a top view of the honda retainer embodying one form of the present invention showing the location of the radial bores and one spiral nail shown apart from the cylindrical member.

Referring now to FIG. 3, there is shown a top view of the honda retainer 12 embodying one form of the present invention. Four radial bores 26 are formed in the squat cylindrical member 20 and are indicated by broken lines. The four radial bores 26 extend from the surface of the squat cylindrical member 20 to the axial bore 22 and are evenly spaced with 90° between adjacent bores 26. The diameter of the radial bores 26 is slightly less than the diameter of the four nails 24, and the four nails 24 (one of which is shown in FIG. 3) have spiral grooves on their shafts to resist removal after insertion into the radial bores 26. Alternately, ribbed nails may be used.

In operation, the lariat 10 is threaded through the axial bore 22 of the cylindrical member 20 until the cylindrical member 20 is placed on the portion of the lariat 10 which will form the lasso 16. A position is selected which will not interfere with the lasso 16 generally, but will prevent the lasso 16 from being fully tightened around the object or animal to be roped. The four nails 24 are driven into the four radial bores 26 to extend into and to engage the lariat 10 to secure the honda retainer 12 in the selected position.

The lariat 10 may then be used in a conventional manner. When the roper catches an animal or object, the honda retainer 12 will prevent the lasso 16 from completely closing down on the catch. Thus, the roper will be able to quickly expand the lasso 16 to resume roping attempts without having to dismount, untie the lariat 10 and remount.

When the use of the honda retainer 12 is no longer desired, the nails 24 may be removed either partially or completely from the squat cylindrical member and the honda retainer 12 may be slid off the lariat 10. Because the nails 24 insert between the fibers of the lariat 10, the device does not damage the lariat and no kinks or twists are introduced.

Although particular embodiments of the present invention have been described in the foregoing detailed description, it will be understood that the invention is capable of numerous rearrangements, modifications and substitutions of parts without departing from the spirit of the invention.

What is claimed is:

1. A honda retainer for a lariat having a honda to prevent a lasso from completely closing down on the catch during training and practice, the honda having an aperture that is dimensioned to receive and slid along the lariat, comprising:

a squat member having a generally central bore, said central bore having a diameter slightly larger than the diameter of the lariat so that the lariat fits snugly in said central bore to admit the lariat therethrough, said squat member being dimensioned to be larger than the aperture of the honda so that said squat member cannot pass through the honda;

at least one lateral bore in said squat member extending from the outside surface of said squat member into said central bore; and at least one elongated member having a pointed end and having sufficient length to extend from the outside surface of said squat member through said lateral bore and into said central bore for the pointed end to extend into the lariat to secure the honda retainer to the lariat, said elongated member having a diameter slightly greater than the diameter of said lateral bore so that when said elongated member is inserted into said lateral bore, frictional engagement of said elongated member with said squat member resists removal of said elongated member;

whereby, the snug fit of the central bore provides for secure attachment of said squat member to said lariat with the elongated members extending only a short distance into the lariat.

2. The honda retainer of claim 1 wherein said squat member is made of plastic.

3. The honda retainer of claim 1 wherein said at least one elongated member is at least one nail.

4. The honda retainer of claim 3 wherein said at least one nail has a spiraled surface to grip said squat member when inserted therein.

5. A lasso system comprising:

a rope;

a honda formed on one end of the rope and having an aperture that is dimensioned to receive and slide along the rope;

a honda retainer for attaching to said rope and being dimensioned larger than the aperture in said honda so that when the rope is passed through the honda to form a lasso, said honda retainer attached to the rope cannot pass through said honda;

a generally central bore formed in the approximate center of said honda retainer and being dimensioned to snugly receive said rope;

at least one lateral bore extending radially from said central bore to the outside surface of said honda retainer; and at least one elongate member having a diameter dimensioned to friction fit within said lateral bore and having a length of greater than the length of said lateral bore for extending through said lateral bore and into said central bore; said elongate members having ends for piercing said rope when said rope is positioned in said central bore to fasten said honda retainer on said rope.

6. The lasso system of claim 5 further comprising a surface configuration formed on said elongate members for gripping said honda retainer and said rope when said elongate members are inserted into said honda retainer and said rope.

* * * * *